Feb. 16, 1937.  A. S. REYNOLDS  2,071,142
SYSTEM OF AUTOMATIC ANTICIPATORY CONTROL
Filed March 18, 1933  4 Sheets-Sheet 1
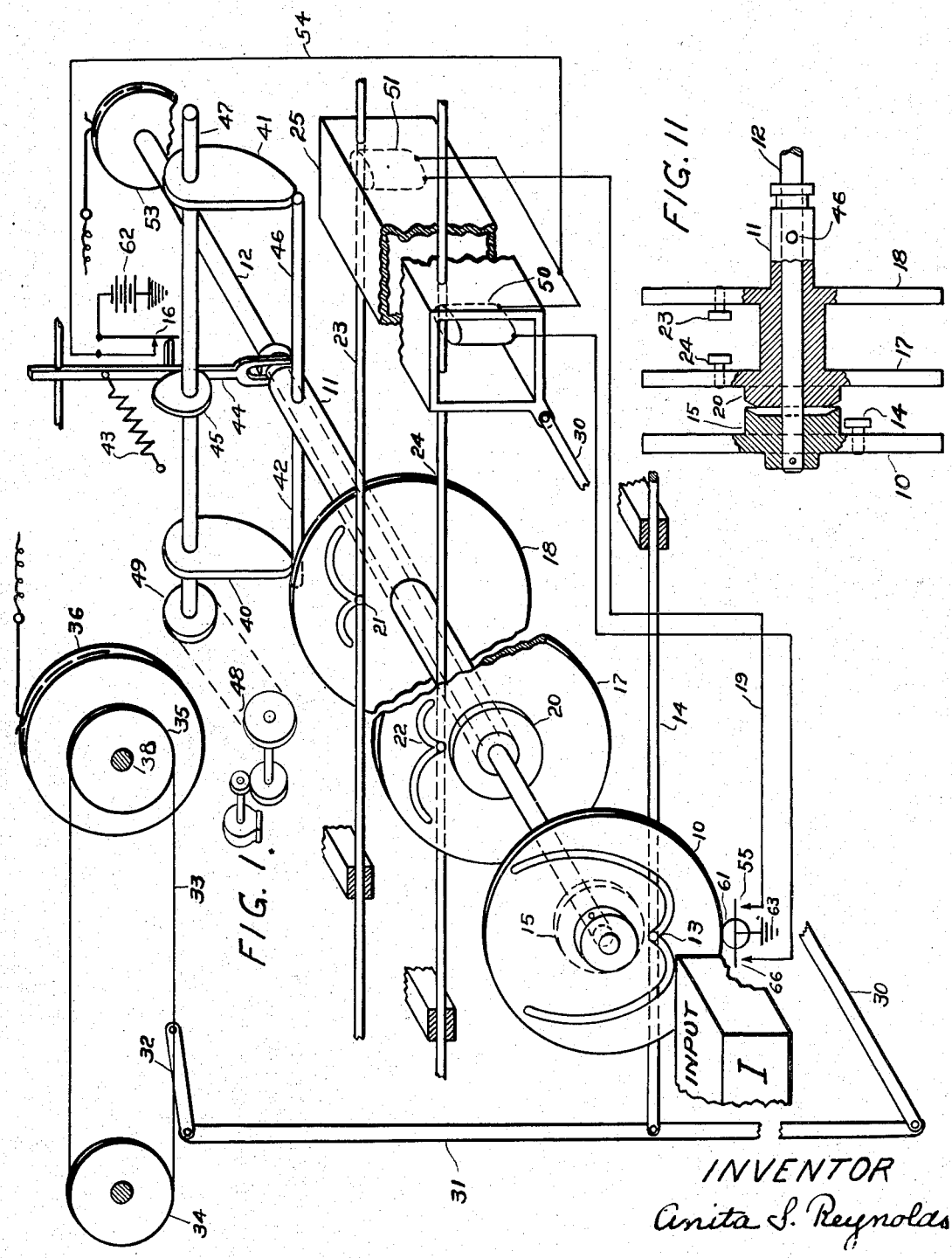
INVENTOR
Anita S. Reynolds.

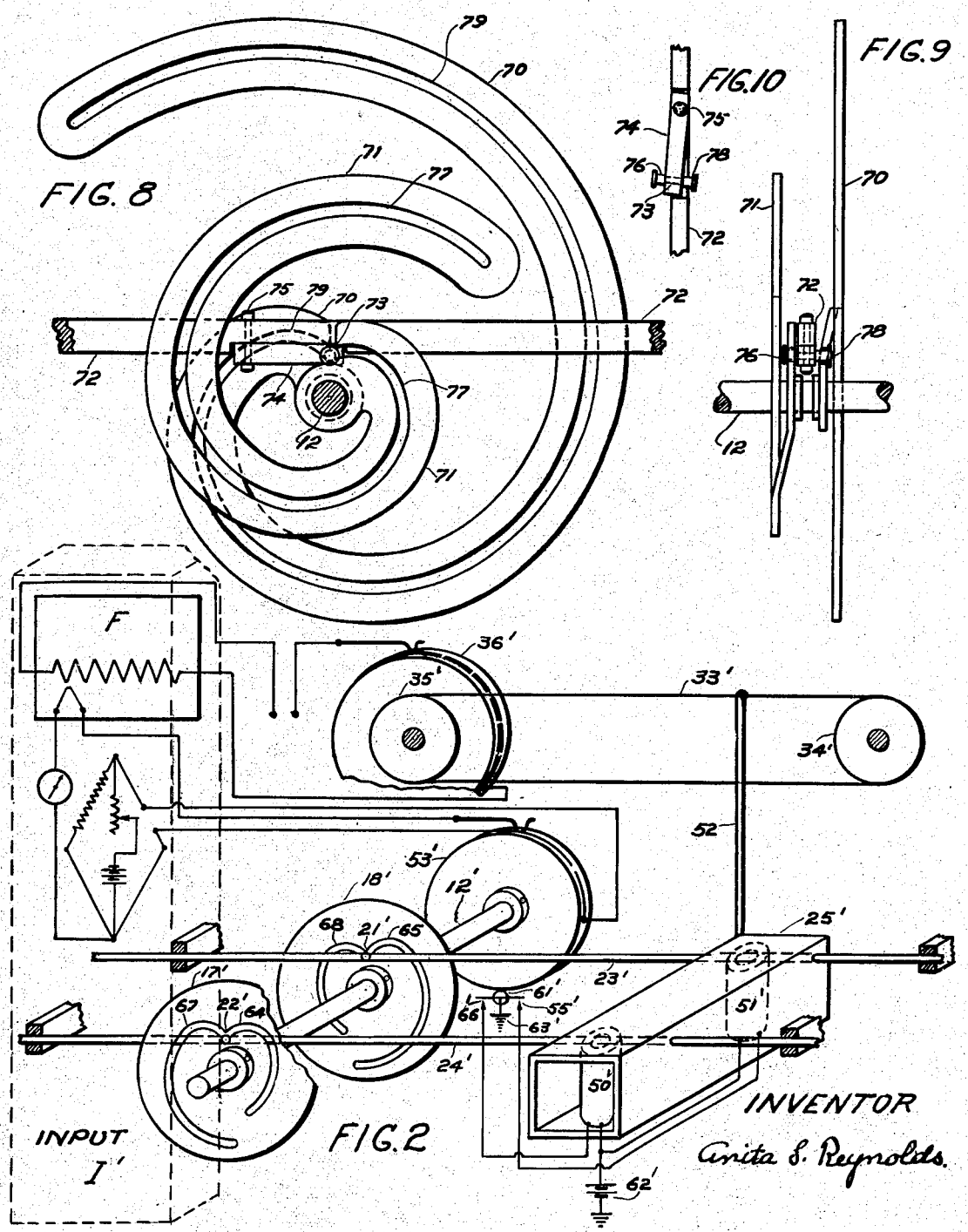

Feb. 16, 1937.  A. S. REYNOLDS  2,071,142
SYSTEM OF AUTOMATIC ANTICIPATORY CONTROL
Filed March 18, 1933  4 Sheets-Sheet 3
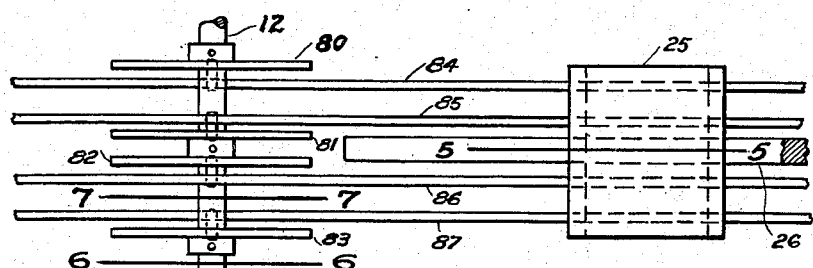
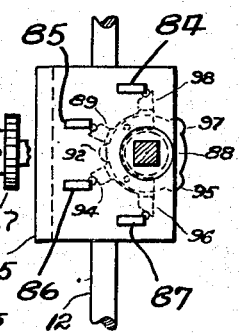
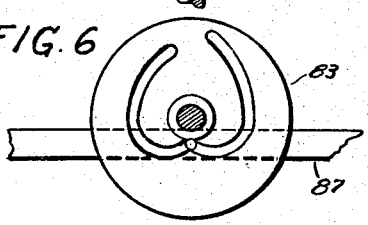
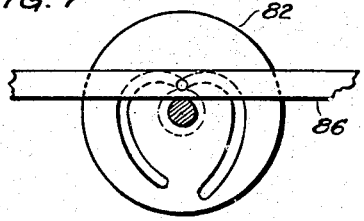
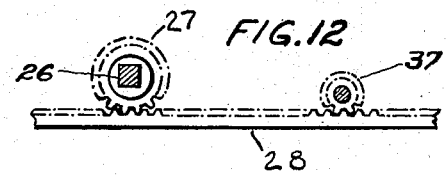
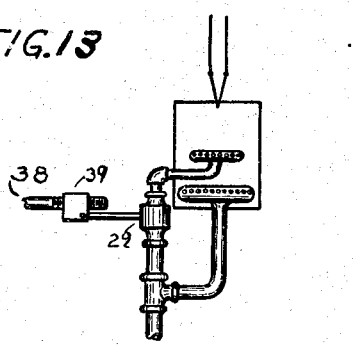
INVENTOR
Anita S. Reynolds.

Feb. 16, 1937.   A. S. REYNOLDS   2,071,142
SYSTEM OF AUTOMATIC ANTICIPATORY CONTROL
Filed March 18, 1933   4 Sheets-Sheet 4
FIG. 14
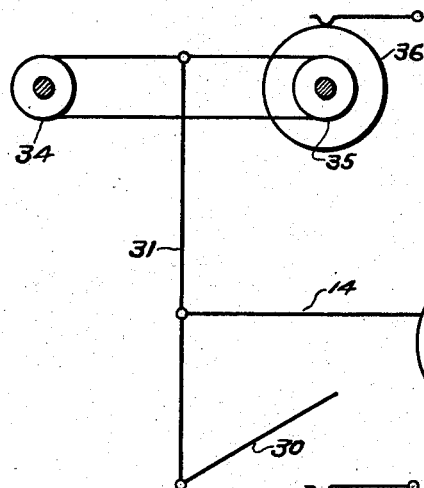
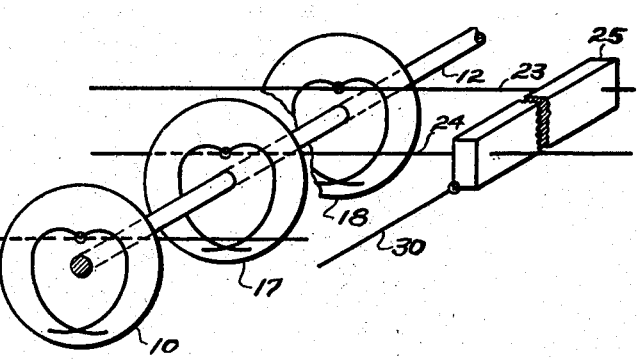
FIG. 15
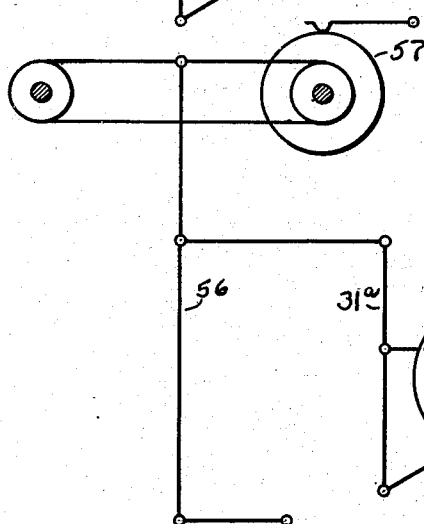
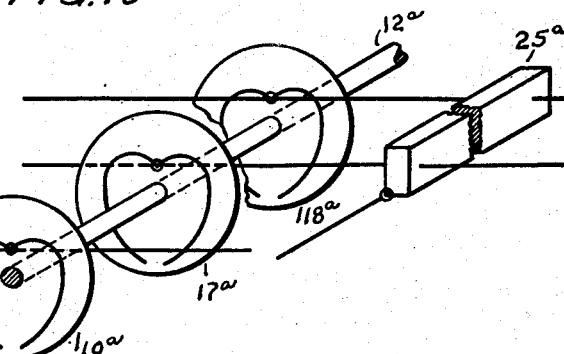
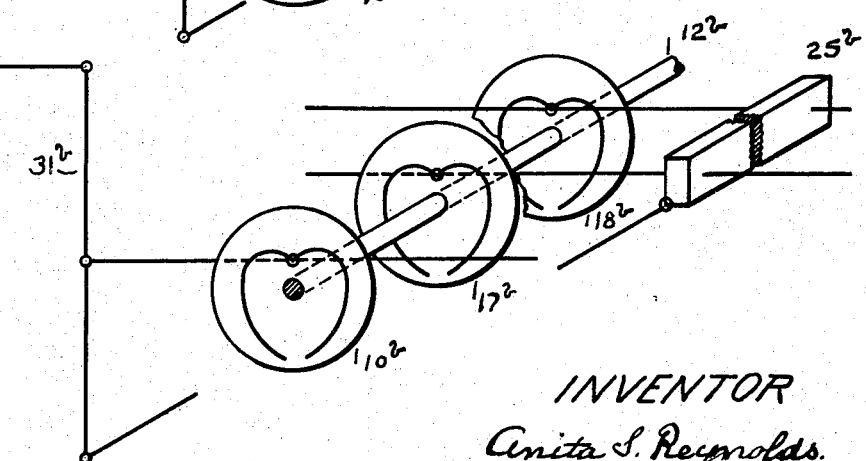
INVENTOR
Anita S. Reynolds.

Patented Feb. 16, 1937

2,071,142

UNITED STATES PATENT OFFICE 2,071,142

SYSTEM OF AUTOMATIC ANTICIPATORY CONTROL

Anita S. Reynolds, Princeton, N. J.

Application March 18, 1933, Serial No. 661,451

23 Claims. (Cl. 236—1)

This invention relates to a system and apparatus for the automatic control of any desired thermal, electrical, chemical condition, or of pressure or other physical condition.

The ideal control system would be one in which the departure from and the return to the normal or desired state could be automatically anticipated in order that the corrective means could be applied at a time and rate such that excessive departures would be avoided; also when the departure has been checked and the trend started towards normal, to so change the corrective means as to anticipate the arrival at a normal or desired condition. In other words, to introduce in mechanical form the equivalent of the actions of a well trained operator who by watching indicators, could take account of the various rates, time intervals and amplitude of movements and apply and remove the corrective measures in such manner as to anticipate the changes, thereby maintaining a closer control.

In my pending application No. 620,143, I have shown means for taking account of both the rate and the amplitude or extent of deviation from normal and making a correction in accordance with the combination of these factors.

Also, in my Patent No. 1,851,596, I have shown means for adding a factor to the correction which represents the lag; also to make a faster movement on the reversal of the trend in returning to normal.

In the present invention, I have combined these improvements in one mechanism in such manner that not only is the rate and total deviation combined in determining the amount of needful correction, but also there is provided means for automatically altering the rate and time of applying and removing the corrective actions depending upon the direction and amplitude of deviation and the rate of change towards or away from the normal.

The combination of all these factors makes it possible to do mechanically what an operator could do by the exercise of experience and judgment.

In some operations this arrangement will take account of certain conditions which are occurring or about to occur, concerning which an operator could have no knowledge.

In a control operation it is often desirable as the factors change resulting in a movement away from normal or the desired state, to apply corrective measures at a relatively high or rapid rate in order to check and reverse the trend before it shall have gone too far. It is also desirable in some control problems and under certain conditions to change the rate of application of the corrective measures at certain periods of the control cycle. These changes may be from a higher to a lower rate or from a lower to a higher rate. The changes may be required while the trend is continuing in one direction or upon the reversal of the trend or upon an approach to the reversal. It is a feature of my invention to provide automatic means for accomplishing these results with the object of anticipating the departure from and the approach to a desired condition and thereby prevent the wide swings so detrimental to many of the present day processes and operations.

Broadly speaking, existing measuring or control systems consist of an indicating or testing device which determines the amount of deviation, and a control device which is automatically adjusted in accordance with the operation of the testing device. For purposes of simplification, I designate the first of the above mentioned functions or devices as the input and the second as the output.

In effect, one of the features of this invention consists in providing between the testing mechanism or input and the control mechanism or output, whether it be controlling heat, pressure or any other physical condition, a number of transmission channels or translating mechanisms operating at different rates, and also in providing means for selecting one of said channels and varying the control at a rate in accordance with the rate of the selected channel.

More specifically, I interpose between the input and the output a plurality of cams each cut in accordance with the rate desired at a particular time or under particular conditions. I provide means for making certain of these cams active for moving the output to the exclusion of the others and thus cause the ultimate control to function in a manner best suited to the changing conditions in the process under control.

Associated with each cam is a rider attached to a sliding rod. The plurality of rods pass into or through a movable structure which moves the output, means being provided to clutch each rod one at a time to the structure so that the latter will travel at the rate of the particular rod to which it is clutched. The order of attachment and detachment may be determined by the direction of rotation or movement of the input, by the relative positions of the plurality of rods, by a timing device or by a combination of the three, all in an order as determined by the particular medium under control.

For engaging and disengaging the rods, I have illustrated both electromagnetic and mechanical clutching means. It is to be understood, however, that the invention is not limited to any of the forms of clutches shown, as any suitable type may be employed without departing from the spirit of the invention.

The objects of this method are several, one being that by translating the movements, I can add to or subtract from the translation, a certain amount which will represent the lag of the system. Another is that I can by this means anticipate and thereby prevent abnormal changes. Still another object is that by this means, I can depart from the old and well-known position control wherein there is a fixed phase or step relation between the condition of the testing and the control adjusting agencies. In other words, by this means, I provide a flexible or floating mechanism which automatically adjusts itself to changing conditions, allowing the testing mechanism to arrive always at a balance at the predetermined position, but permits the control adjusting mechanism to assume an independent position not necessarily in phase with the testing.

In the illustrated example of my apparatus, I have chosen a common and well-known type of input and output. Some of the parts and their mode of operation are disclosed in prior Letters Patent of the United States to Leeds No. 1,125,699, my invention comprehending but not being limited to their employment.

My invention is applicable to any type of controlling or measuring system for physical, electrical or chemical quantities, irrespective of the form of the indicating, or controlling mechanism. The choice of the controlling or indicating mechanism will depend upon the nature of the scientific or industrial problem to be solved.

For example, it may be employed where it is desirable to have the mechanism in constant engagement with the input and to have periodic engagement with the output as illustrated in Fig. 3 of my pending application 620,143.

It may equally well be employed where the testing is periodic and the engagement with the output is also periodic as in Fig. 2 of pending application No. 620,143. It may also be employed where the testing is periodic and the engagement with the output constant as in Fig. 1 of this application.

It will be observed, therefore, that my invention may be applied to any of the existing types or methods of control or measurement. It is also equally applicable whether the movements of the input and output are rotary or rectilinear.

Since I employ cams for translating the movements of the input and since many of the existing devices are of the rotary type, which may require more than one revolution of the cam, I have devised a new type of spiral cam which operates in a similar manner to the well-known but limited motion, heart-shaped cam for translating a rotary movement into a rectilinear one. Such a cam obviously can be rotated only a part of a complete revolution in either a clockwise or a counter-clockwise direction, since to rotate further would cause the two cam surfaces to cross and interfere with the free movement of the rider.

It is a feature of my invention to provide for this condition by a new type of spiral cam composed of two separate parts each mounted in a different plane and employing a double ended rider, one half of the rider operating on the clockwise section of the cam, and during that period, the other half being out of engagement with either cam. Upon reaching dead center on the return movement, the first half of the rider passes out of engagement with the clockwise section and at this time the second half of the rider goes into engagement with the counter-clockwise section. By this means I am not limited in the number of revolutions or in the length of rectilinear movement possible for the rider.

In any control apparatus each and every movement of the input must be followed by a movement of the output. Therefore, it will be observed that the common forms of spiral cams, either of the disc or drum type, will not be suitable for this purpose as the tracks lie in the same plane and a shuttle shaped rider must be used to prevent following the wrong groove at a point of intersection. The use of this type of rider necessitates a section of groove at the position of reversal or at the position where the rider changes from one to the other of the different grooves, in which there will be angular movement without a corresponding rectilinear movement. It will be noted that I obviate this difficulty by placing the two grooves in different planes and that there is, therefore, no position of angular movement without a resultant rectilinear movement.

The various cams illustrated may be similar as regards rate or slope, or they may be dissimilar as conditions may require.

In my Patent No. 1,851,596, I have shown means for adding a correcting factor to compensate for lag in a system. This is a single means, self-actuating in that the compensation is accomplished by the movements of the testing mechanism without the aid of another source of power or mechanism extraneous to the instrument.

In my present invention, I have introduced a plurality of means, all internal to the mechanism but separate and distinct, one from the other, and all operated by the movements of the instrument without the aid of a separate source of power.

For the purposes of this application, I have illustrated several forms of the invention as applied to a conventional type of heat responsive and control mechanism. It is to be understood, however, that the invention is not limited to any of these forms of mechanisms, or to the control of temperature or pressure only, or to the particular type of input referred to. It is applicable to any type of controlling or measuring system for physical, electrical or chemical quantities, irrespective of the form the input or output may assume, and to any of the existing forms of indicating or controlling mechanisms. The choice of the controlling or indicating mechanisms, the type of input and output, and the magnitude of the rate of anticipatory control desired will depend upon the nature of the problem to be solved.

In one embodiment of my invention, for example, Fig. 1, I interpose between the input (I) and the output, a mechanism consisting of the following parts:

A first part comprising a cam specially cut in accordance with the needs and nature of the particular elements under control. Each cycle of operation that a deviation occurs, this cam is rotated clockwise or counter-clockwise by the input, its position representing the total deviation.

A second part comprising a plurality of cams cut with varying degrees of slope in accordance with the needs and nature of the particular processes under control, to add a rate factor to the total deviation factor of the first part.

A third part comprising a pair of clutch elements, one attached to the total deviation cam and the other attached to the plurality of rate cams, the purpose being to cause the latter cams to be displaced in unison with the total deviation cam.

A fourth part comprising a restoring means for returning the rate cams to normal position during each cycle of operation.

In the cutting of all of the cams, provision can be made for the lag of the entire system, for required anticipation, and for the nature of the elements under control.

A fifth part comprising a movable structure slidably associated with rods connecting with the riders engaging the plurality of cams noted in the second part. Embodied in this structure is a clutching means to enable any one of the said rods to be selectively engaged with the structure in order that the latter may move in unison with the selected rod.

A sixth part comprising a lever arm, one end of which is attached to the output, the other end being attached to the structure described under the fifth part above, the central portion of the lever arm being attached to a rod having a rider engaging with the cam under the first part noted above. This lever moves the output in accordance with the result of the combined movements of the first and second parts. The extent of this final movement of the output is therefore the result of a combination or integration of first, the amount of the anticipatory control required according to the total deviation, and second, the amount required in accordance with the number of degrees of change in one unit of time. This part may be termed a mixer or an integrating lever or bar, since it is used for combining or integrating the movements of the first and second parts.

For some purposes, the single cam described under the first part may be replaced by two or more such cams as are described under the second part also operating through rods to move another member similar to the structure described under the fourth part.

In Fig. 2, there is shown a simpler form of my invention in which the integrating feature has been dispensed with and the traveling structure allowed to operate directly on the output. In this construction I have shown both fast and slow cams with the riders attached to rods which pass through the traveling structure, the latter carrying electromagnetic means for clutching the rods to the structure.

Figs. 1 and 2 are perspective views and for clarity of illustration, the various parts are shown separated, but in operation it is to be understood that they will be in close relation as shown in Fig. 11.

Fig. 3 is a plan view in which I have shown four cams and rods associated with the traveling structure in order to indicate the possibility of changing the rate in varying degrees and at various times during the cycle of operations.

Fig. 4 is an end view of the structure shown in Fig. 3.

Fig. 5 is a sectional view of the same structure.

Fig. 6 is a side elevation on the line 6—6 of Fig. 3 showing the cam 83.

Fig. 7 is a similar view on the line 7—7 of Fig. 3 showing the cam 82.

Fig. 8 is a side elevation on an enlarged scale of the spiral cams which can be used to replace any of the illustrated cams such as Figs. 6, 7, etc.

Fig. 9 is an end view of Fig. 8.

Fig. 10 is a plan view of the shifting rider arm.

Fig. 11 is a sectional view of the three cams and the clutch plates illustrated in Fig. 1.

Fig. 12 shows a means of operating the rod and cam selecting means.

Fig. 13 is a view showing a valve in place of a rheostat.

Fig. 14 is a schematic view showing the direction of movements of the various rods illustrated in Fig. 1, when greater movements are required such, for example, as with the spiral cams of Fig. 8.

Fig. 15 is a schematic view showing the combination of a plurality of the mechanisms illustrated in Fig. 1, operating an integrating mechanism as described hereinbefore under the 6th part.

Referring to Figs. 1 and 11, the input mechanism illustrated by the box I moves the cam 10 which, with the clutch member 15 attached, is pinned to shaft 12. Traveling in the grooves of 10 is the rider 13, the latter being attached to rod 14. Rotatably mounted on the shaft 12 is the sleeve 11. This sleeve has mounted on it clutch member 20 and cams 17 and 18. Sleeve 11, with clutch member 20 and cams 17 and 18, can also be moved a sufficient amount longitudinally along the shaft 12 to permit engagement and disengagement of clutch members 15 and 20. This longitudinal movement is caused by the forked member 44 engaging with the annular groove on the end of 11.

Operating in the grooves of cams 18 and 17 are the riders 21 and 22 which are attached to the sliding rods 23 and 24. These latter rods normally slide freely through structure 25. Mounted in 25 in position to engage either of the two rods 23 and 24 are two clutch magnets 51 and 50.

The central portion of lever 31 is pivotally mounted on one end of rod 14. The lower end of 31 is pivotally attached to one end of the arm 30, the other end of 30 being attached to structure 25. On the upper end of 31 there is pivotally mounted a link 32 which is attached to chain 33 passing over idler 34 and engaging with sprocket 35. Attached to 35 is the rheostat 36 the adjustment of which is the end to be accomplished.

Mounted on the end of shaft 12 is the rheostat 53 which is associated with the potentiometer circuit illustrated in Fig. 2.

The timed control shaft 47 is driven by a chain 48 engaging with sprocket 49. The chain 48 also engages with a timed sprocket (not shown) which may be in the input I or operated by any other convenient means. The object of this is to provide for the functioning of the apparatus during the same time intervals employed in the testing or input mechanism. Shaft 47 carries two cams 40 and 41 which serve to restore the sleeve 11 by means of arms 42 and 46 after 11 has been rotated through the medium of clutch members 15 and 20.

Shaft 47 also has pinned to it cam 45 which engages on each cycle of operation with the forked member 44. It will be seen in the sectional view, Fig. 11, that the cam 10, with its associated clutch member 15, is pinned to shaft 12. Sleeve 11 rotates freely on shaft 12, but has in addition a short longitudinal movement sufficient to engage and disengage 15 and 20. Clutch member 20 and cams 17 and 18 are rigidly connected to sleeve 11.

Fig. 2 shows a simpler form of the invention useful under certain conditions, in which I make use of the total deviation but not the rate or the integration of the total deviation and rate. I have therefore dispensed with the rate cams and the integrating lever 31. In this embodiment, the input mechanism indicated by the box I' rotates the shaft 12' and the two cams 17' and 18' which are pinned to the shaft. The rider 21' attached to rod 23' travels in the groove of cam 18' and the rider 22' attached to rod 24' travels in the groove of cam 17'.

Normally sliding freely on rods 23' and 24' is the movable structure 25' and mounted inside 25' are the two clutch magnets 50' and 51'. The magnets are arranged when energized to clutch the magnetic material rods 24' and 23' in order that structure 25' may be moved longitudinally by either of them.

Mounted on 25' is an extension 52 which is attached to the chain 33'. This latter passes over idler 34' and engages with sprocket 35' which is attached to rheostat 36' which is the end result or output. Both 35' and 36', while attached to each other, revolve freely on their bearings when moved by chain 33'.

Also attached to shaft 12' is the rheostat 53' which, with its contacting brush, forms a part of the well-known potentiometer circuit for deflecting the galvanometer needle.

In this illustration, the furnace is shown diagrammatically at F and for simplicity of illustration, the rheostat 36' is shown as increasing or decreasing the flow of current through the heating unit. It is obvious that any of the well-known heat changing arrangements may be operated by the rotation of 36'.

The usual method of measuring the temperature of the furnace by means of a thermocouple is illustrated in Fig. 2. The electromotive force produced by the thermocouple 100 in the furnace F is balanced against the potential difference between the end 105 of the resistance 101 which is on the circumference of the rheostat 53' and the sliding contact 106. This potential difference across the resistance 101 is maintained constant by a potentiometer circuit consisting of a battery 102, fixed resistance 103, and adjustable resistance 107 which is provided to regulate the battery current to the desired value.

When the electromotive force of the thermocouple 100 equals the potential difference produced between the point 105 of the resistance 101 and the sliding contact 106 by the potentiometer circuit, no current will flow in the galvanometer 104. When a difference exists between the electromotive force of the thermocouple 100 and the difference of potential between the point 105 of the resistance 101 and the sliding contact 106, a current will flow through the galvanometer in a direction depending upon whether the electromotive force of the thermocouple is greater or less than the difference of potential between the point 105 of the resistance 101 and the sliding contact 106. The deflection of the galvanometer needle causes a rotation of the shaft 12' to adjust the sliding contact 106 until a balance is again established. As shaft 12' rotates, box 25' is moved which rotates rheostat 36' by means of extension 52, cable 33', and pulley 35'. Rheostat 36' adjusts the current from source 110, contact 109 adjusting resistance 108 to heating element 111 which changes the temperature of furnace F.

A similar thermocouple and potentiometer arrangement may be employed for Fig. 1.

It is to be noted in connection with Fig. 2, however, that since the balancing rheostat 53' is pinned to shaft 12', it will always return to the same position when the temperature is balanced, but since control rheostat 36' is not directly associated with 53' but is moved independently at varying rates caused by the cuttings of cams 17' and 18', moving rods 24' and 23', and through them structure 25', 36' may assume a position to produce a flow of heat that will cause the balancing, which position may or may not be the same at all times due to varying conditions in or surrounding the furnace. This is an important feature of the invention.

Referring to Fig. 3, it will be noted that the two cams 17 and 18 have been replaced by four cams 80, 81, 82 and 83, all mounted on shaft 12. These cams, through their riders, operate rods 84, 85, 86 and 87. The object of this is to illustrate a means by which the control can be shifted from one channel to another as occasion may require a change in the rate of applying the corrective measures.

The end elevation, Fig. 4, shows the rods 84, 85, 86 and 87 arranged in circular formation around the shaft 12 in order that the engaging shaft 26 may rotate a clutching cam 88 so as to enable the structure 25 to become attached to any one of the four rods as conditions may require.

Fig. 5 shows a sectional view of structure 25 on the line 5—5 on Fig. 3 to indicate how a rotation of 26 revolves cam 88, causing latch spring 89 to engage with one of the four rods which are all provided with fine teeth or serrations on one edge. There is a latch spring similar to 89 associated with each of the four rods.

26 is a square section shaft sliding freely in cam 88 and bearings 90 and 91, which latter rotate freely in structure 25. It will therefore be observed that a rotation of 26 one step in a clockwise direction will cause projection 92 on cam 88 to engage with spring 89, causing the latter to engage with the serrations on rod 85, causing the structure 25 to become clutched to rod 85 and to move at the same rate as 85 moves. A counter-clockwise movement of one step will cause 92 to engage spring 94 to rod 86.

Two clockwise steps will cause projection 95 to engage spring 96 to rod 87 and two counter-clockwise steps will cause projection 97 to engage spring 98 to rod 84. It will therefore be seen that by the direction of rotation of 26 and the number of steps taken, the structure 25 may be clutched to any one of the four illustrated rods and that 25 will then be moved at a rate as determined by the slope of the cam associated with that particular rod.

Fig. 12 illustrates a means by which the square shaft 26 may be stepped around to select any one of the four rods. The stepping may be caused by any suitable means such, for example, as a timed mechanism operating gear 37 or by the condition of the medium under control.

As noted above, any one or all of the cams illustrated in Figs. 1, 2 and 3 may be replaced by a pair of spiral cams for such conditions as may require a greater angular movement or rotation than is permissible with a simple disc type cam. A pair of such spiral cams are shown on an enlarged scale in Figs. 8 and 9.

Referring to Fig. 8, cam 70 is illustrated as having a comparatively steep slope, while its mate, cam 71, is illustrated as having a slope of lesser degree. The rod 72, which is operated by this pair of cams, is mounted between them and has a double headed rider 73 attached to a pivoted lever arm 74 which is pivotally mounted on rod 72 by the screw 75.

The double headed rider 73 is provided with an enlarged section on each of the two ends in order that once engaged with the groove in either cam, it cannot become disengaged until ready at the central point (Fig. 8) to engage with the other groove. If the cams 70 and 71 rotate on or with shaft 12 in a counter-clockwise direction, the section 76 of 73 will travel into the groove 77 of cam 71 and as the latter recedes because of the spiral, away from the center arm 74 will be drawn to one side, as shown in Fig. 10, so that the other end 78 of 73 will be traveling out of the path of cam 70 and will not interfere with the latter where the two cams cross each other's path. This operation will cause the rod 72 to be moved towards the left hand.

Upon a reversal of direction of rotation, 72 will be moved towards the right and upon reaching center, as shown in Fig. 8, a further rotation in a clockwise direction will cause section 78 of rider 73 to enter the groove 79 of cam 70, and rod 72 will continue to be moved towards the right hand. The terms right and left hand are used with reference to Fig. 8.

The continued movement of the cams will cause rider 73 to be drawn to the side opposite to that shown in Fig. 10, so that section 76 will not interfere with cam 71 at the point where the grooves of the cams cross.

As illustrated in Fig. 13, the output rheostat 36 may be replaced by a valve 29 operated by nut 39 traveling on threaded portion of shaft 38, for gas heating.

Referring to Fig. 1, it will be noted that since the rod 14 associated with cam 10 moves in one direction and the two rods 24 and 23 associated with cams 17 and 18 move in the opposite direction, there may be a condition where long cam travels are required, when the integrating lever 31 may be tilted too far for satisfactory operation of the output. Under such conditions, the plan shown schematically in Fig. 14 may be employed. With this arrangement, since the rods move under ordinary conditions in the same direction, a greater longitudinal movement of 31 may take place without excessive tilting.

The embodiment shown in Fig. 15 is an arrangement whereby several factors governing the condition of a medium under control may be taken into account to automatically move the output. For example, in certain chemical operations, it may be desirable to make the final movements of the output dependent on the condition of two or more separate and distinct mediums.

In this arrangement, the two separate integrating levers 31a and 31b are each operated in a manner similar to that described for Figs. 1 and 14. Their movements are then transferred to the final integrating lever 56 which moves the output 57. In this manner, it will be observed that the movement of the output is the integration or resultant of several changing conditions. It is obvious that this arrangement may be extended further to include a plurality of primary movements affecting the resultant movement.

I have shown only sufficient mechanism to illustrate the principles involved and have omitted such parts as are not definitely required to enable one skilled in the art to understand the functions and operation of the devices.

It is to be understood that in the several illustrations, the conventional forms of cams, riders, drive, clutching mechanism, etc., are shown merely to illustrate certain embodiments of the invention and that these details, as well as others, may be varied without departing from the spirit of the invention as defined in the claims.

The operation of the embodiment illustrated in Figs. 1 and 11 is as follows: Assuming that the mechanism contained in the input 1 is arranged to respond to temperature changes as described in detail in Patent No. 1,125,699, a decrease in temperature in, for example, a furnace (not shown) will cause a counter-clockwise rotation of cam 10. At this time spring 43 will be pulling forked arm 44 and sleeve 11 towards cam 10, thus causing engagement of clutch member 20 with clutch member 15. Therefore, clutch member 20, sleeve 11, and cams 17 and 18 will also be rotated in a counter-clockwise direction. During this period of the cycle of operation, shaft 47 is in a position such that cam 45 is out of engagement with arm 44 and cams 40 and 41 are out of engagement with arms 42 and 46. The counter-clockwise rotation of sleeve 11 will raise arm 46 towards cam 41, at the same time lowering 42.

The rotation of cam 10 will cause a movement towards the right of rod 14 because the rider 13 is traveling in the groove of cam 10. This movement of rod 14 will move the upper part of arm 31 to the right.

Since cams 17 and 18 are rotated in a counter-clockwise direction, rods 24 and 23, by means of their riders 22 and 21, will be moved to the left.

The rotation of cam 10 also rotates the insulated contact wheel 61, causing contact 55 to close, energizing clutch magnet 51 from ground 63 through wires 19 and 54, and normally closed contact 16 to battery 62.

The energizing of clutch magnet 51 engages the traveling structure 25 with rod 23 so that as 23 moves to the left due to the rotation of cam 18, structure 25 will be moved at the same rate. Since 25 has pivoted to it one end of arm 30, the other end being attached to lever 31, the lower part of 31 will be moved to the left, giving the upper end a movement additional to that given by rod 14 under control of cam 10. The result of these combined movements serves to rotate rheostat 36 to increase the heat.

During the operation just described, shaft 47 has been rotating in a counter-clockwise direction viewed from the end marked 47. Cam 45 now engages arm 44, opening contact 16 to release clutch magnet 51. This action draws sleeve 11 towards rheostat 53, thus disengaging clutch members 15 and 20. Further rotation of shaft 47 causes cam 41 to engage arm 46 to restore sleeve 11 with cams 17 and 18, and clutch member 20 to normal angular position. During this operation, since magnet 51 is deenergized, rod 23 will slide freely through structure 25, allowing the latter and the output 36 to remain stationary until the next cycle occurs.

The functions performed by the movements described are as follows: The cutting of cam 10 represents the total deviation while the cutting of cams 17 and 18 represents the rate of deviation, since shaft 47 is driven by the chain 48 from a timed source of power either in the input 1 or separate from it as desired. The total movement of lever 31 is transmitted through arm 32 to chain 33, sprocket 35 and finally to the input rheostat 36 which controls the input of heat to a furnace (not shown in this view) which is the medium under control. Therefore, the rheostat 36 will be moved a certain amount in accordance with the total deviation and an additional amount for the rate of deviation.

Assuming now that the correction that has taken place is of sufficient magnitude to cause a reversal of the movement of the input I, during the next cycle of operation cam 10 will be rotated in a clockwise direction, moving rod 14 to the left and rods 23 and 24 to the right. The change of direction of cam 10 will rotate wheel 61 in a direction to open contact 55 and close contact 66, thus energizing clutch magnet 50, so that the movement of structure 25 will now be under control of cam 17. Under conditions where it is desired to move the output at a faster rate on its return to a normal position than it has been moved away from normal, the cutting of cam 17 will be such that structure 25 will be moved back more rapidly than it was moved away from its normal position. Should the contrary condition be desired and a less rapid return movement be desired, the cutting of cam 17 will be such that structure 25 will be returned at a slower rate than the rate at which it originally moved away from normal. It will therefore be seen that by varying the slopes of the rate cams 17 and 18, the rate factor may be applied to the output at different speeds, depending upon, for example, the direction of trend of the deviation.

What has been described above is a condition where a decrease in temperature in the medium under control has occurred and it has been desired to raise the influx of heat to compensate for this decrease. Should, however, the reverse condition occur and an increase in temperature of the output be encountered, then the operations would be the reverse of those described above. Starting from a normal position, cams 10, 17 and 18 will be moved in a clockwise direction, raising arm 42 towards cam 40; moving rod 14 to the left and rods 23 and 24 to the right, energizing magnet 50 to engage structure 25 with rod 24. These combined movements are transmitted to lever 31 and to output 36 to reduce the heat.

The continued rotation of shaft 47 now causes cam 45 to engage forked lever 44, sliding sleeve 11 in a direction to disengage clutch members 15 and 20, at the same time opening contact 16 and deenergizing clutch magnet 50. This action frees structure 25 from rod 24. Continued rotation of shaft 47 causes cam 41 to engage arm 46, rotating sleeve 11, cams 17 and 18, and clutch member 20 back to their original positions. This action has not disturbed the position of 36 because of the deenergization of magnet 51.

Now assuming, for example, that the action described is the equivalent of one degree change in one unit of time and that several such small changes to a total of 5 take place in 5 succeeding units of time, the rheostat 36 will have been moved away from its starting position an amount equivalent to the total deviation and the summation of the several rates of deviations.

The slope of the cams 17 and 18 is such that had the first movement been a relatively greater deviation in that one unit of time, say for example 5 degrees, there would have been a greater total movement of rheostat 36, thus taking into account the more rapid change that had taken place and giving a greater movement of the output on that account.

The important point to be noted in all of the operations described is that when a deviation occurs, the total deviation cam 10, with each cycle of operation, is moved in the direction of trend and remains in that position until the next cycle of operations. The two rate cams 17 and 18, however, will be moved away from normal to add their movement to structure 25 and thence through arm 30 to lever 31 and the final output 36, but after each such movement, 25 is released from engagement with either of rods 23 or 24 and these rods, together with cams 17 and 18, are restored to their original positions.

The operation of the embodiment shown in Fig. 2 is as follows: Upon a decrease in temperature in the furnace F, the shaft 12' will be rotated in a counter-clockwise direction by the operation of the input contained in box I'. The rotation of rheostat 53' rotates by friction the insulated contact wheel 61', causing contact 55' to close, completing a circuit from battery 62' through clutch magnet 51', contact 55' to ground 63'.

The energizing of 51' clutches rod 23' to the structure 25'. The rotation of 12' rotates the two cam structures 17' and 18', causing the two rods 24' and 23' to be moved to the left. The rider 22' attached to rod 24' will travel in the groove 64 of cam 17' and the rider 21' attached to rod 23' will travel in the groove 65 of cam 18'. Since 65 is more steeply sloped than 64, rod 23' will move to the left at a faster rate than will rod 24'.

During the operations just described, arm 52, attached to 25' and acting through chain 33', has rotated rheostat 36' in a counter-clockwise direction through a greater angle than the balancing rheostat 53' has been rotated. This movement of 36' serves to increase the flow of current in the furnace F. Assuming now that several cycles of operation are required before rheostat 53' brings the potentiometer circuit into balance, it will be observed that 25' will have been moved to the left a greater distance than rod 24'.

The furnace having now risen in temperature to the point where a reversal takes place, 53' and 61' will reverse their direction of movements, opening contact 55' and closing contact 66'. This action deenergizes clutch magnet 51' and energizes clutch magnet 50', disengaging rod 23' from structure 25' and engaging rod 24'.

Assuming that the change in the furnace requiring more heat is of such a nature that more heat is continuously required for a certain period, then the condition just described may remain constant for a period requiring no further change in the supply of current. When the time arrives that less heat is required, structure 25' will be moved to the right at a lower rate than it was first moved to the left, since it is now clutched to rod 24' which is being moved by groove 64 which has a less steep slope than groove 65 moving rod 23'. It will be seen, therefore, that if the conditions causing the original change as described require continuously a greater supply of heat, then the rheostat 53' may return to its original position, but the current supply rheostat 36' may be left in a more advanced position.

If the original movement was caused by an increase in temperature, then the reverse of the operations first described would take place. Shaft 12' would rotate in a clockwise direction, energizing clutch magnet 50', engaging rod 24' and moving structure 25' to the right at a faster rate than the movement of rod 23'. It will thus be seen that in the various movements necessary to establish a proper balance, the control rheostat 36' does not necessarily remain in step with the balancing rheostat 53'. Thus there is obtained a floating control.

It is obvious that for other conditions than that illustrated, the control rheostat 36' may be replaced by a valve operating as illustrated in Fig. 13.

What I claim is:

1. The method of temperature control which consists in producing upon a departure from a desired normal an effect which is a function of the rate of temperature change, of the departure of the temperature from a predetermined magnitude and the increment of lag of said departure, controlling by said effect the application of heat for varying the temperature, and upon a reversal of said departure producing a different effect.

2. The method of controlling the condition of a medium which consists in producing upon a departure from a desired normal an effect which is a function of the rate of change in said condition, of the departure of the condition from a predetermined magnitude and the increment of lag of said departure, controlling by said effect the application of means for varying the condition, and upon a reversal of said departure producing another effect.

3. The method of temperature control which consists in testing the temperature, simultaneously adjusting the positions of a plurality of rate translators in accordance with said testing, selecting one of said translators and transmitting the result of said testing through the medium of said selected translator for the purpose of applying heat.

4. The method of temperature control which consists in testing the temperature, simultaneously adjusting the positions of a plurality of rate translators in accordance with said testing, selecting one of said translators and applying heat at a rate determined by said selected translator.

5. The method of controlling the condition of a medium which comprises testing said condition, simultaneously moving a plurality of agencies having different transmission rates in accordance with the indications of said testing, selecting one of said agencies and transmitting the result of said testing to a control agent at the rate determined by said selected agency.

6. The method of temperature control which consists in testing the temperature, simultaneously moving a plurality of agencies having different transmission rates in accordance with the indications of said testing, selecting one of said agencies and transmitting the movement of said testing to apply heat at a rate determined by the transmission rate of said selected agency.

7. An automatic system of temperature control comprising an instrument responsive to temperature changes, a plurality of members advanced and returned by said instrument, a movable structure in sliding association with said members, and selective clutching means operated by said instrument for clutching any one of said members to said structure for movement thereby.

8. An automatic system of temperature control comprising an instrument responsive to temperature changes, a plurality of members moved in two directions by said instrument at different rates of speed, a movable structure in sliding association with said members, and selective clutching means, operated by said instrument, for clutching any one of said members to said structure for movement thereby.

9. A system for the control of a medium comprising an instrument responsive to changes in the condition of said medium, a plurality of means advanced and returned by said instrument, a movable structure in association with said means and selective clutching means operated by said instrument for clutching any one of said means to said structure to control the condition of said medium.

10. In a control device an input and an output, means for moving said input, an integrating member, a cam cut in accordance with the total deviation from normal of said input, a plurality of cams cut in accordance with the deviation of said input per unit of time, means for engaging any one of said plurality of cams and means for moving said member in accordance with the conjoint movements of said cams to effect movement of said output.

11. A control system comprising a testing instrument, a movable member, means responsive to changes in a condition to be controlled, for causing movement of said member, normally inactive means operated by said instrument for varying the relationship between said means and said member for causing additional movement of said member, and means responsive to a predetermined change in said conditions for anticipating a necessary movement of said member and for energizing said means second mentioned and causing an earlier movement to be supplied so that the future relation between the condition and the movement of said member will be correct.

12. In a control system the method of moving the output in accordance with the movement of the input through the medium of a first cam, upon a reversal of trend, moving the output in accordance with the movement of the input through the medium of a second cam, said first and second cams operating to move said output at different rates.

13. In a control system the method of moving the output in accordance with the movements of the input through the medium of a first means, translating said movement at a certain rate, upon a reversal of the trend, moving the output in accordance with the movement of the input through the medium of a second means and translating said second movement at a different rate.

14. In a control system the method of moving the output in accordance with the movement of the input through the medium of a first means, upon the reaching of a predetermined condition, moving the output in accordance with the movement of the input through the medium of a second means, said first and second means functioning to produce said movements at different rates.

15. In a control system the method of moving the output in response to movements of the input through the medium of a plurality of translating means, said means functioning at a plurality of variable rates.

16. In a control system, an input and an output, a first shaft and a second and a third shaft between said input and output, means for transmitting motion from the first to the second shaft at one rate, means for transmitting motion from the first shaft to the third shaft at a different rate, and means dependent on the direction of rotation of the first shaft for selectively operating the output by the second and third shafts.

17. In a control system, an input and an output, a first shaft and a second and a third shaft between said input and output, means for transmitting motion from the first to the second shaft at one rate, means for transmitting motion from the first shaft to the third shaft at a different rate, and means for selectively operating the output by the second and third shafts.

18. That method of maintaining the temperature or pressure of a system substantially at a constant value which is characterized by creating a governing force which is proportional to the algebraic sum of the condition change and the rate of change during the time that the trend of said change is away from normal, and upon a reversal of said trend creating a different governing force during the return period of said temperature or pressure to the constant value.

19. That method of maintaining the temperature or pressure of a system substantially at a constant value which consists in integrating the condition change and the rate of change to produce a governing force proportional to said integration, applying said governing force upon a departure from said constant, and upon a reversal of said departure applying a different governing force.

20. That method of maintaining a controllable condition substantially constant which is characterized by measuring said condition, upon a departure from said condition creating a governing force which is proportional to the algebraic sum of the condition change and the rate of change, applying said force to control said condition, and upon a reversal of said departure creating a different governing force and applying said different force to control said condition.

21. That method of maintaining a controllable condition substantially constant which is characterized by measuring said condition, upon a departure from said condition creating a governing force which is proportional to the algebraic sum of the condition change and the rate of change, applying said force to control said condition, and at a predetermined period creating a different governing force and applying said different force to control said condition.

22. That method of maintaining the temperature or pressure of a system substantially at a constant value and in which during a departure from the constant value a governing force is created which is proportional to the integration of a plurality of condition changes and a plurality of rate changes, and upon a reversal of said departure a different governing force is created.

23. That method of maintaining the temperature or pressure of a system substantially at a constant value which is characterized by the following steps: during a departure from the constant value creating a governing force proportional to the summation of a plurality of condition changes, and upon a reversal of said departure and during a return to said constant creating a different governing force.

ANITA S. REYNOLDS.